Jan. 7, 1947.                F. F. PEASE                2,413,995
                             BAR TRIMMER
                 Original Filed Nov. 29, 1941    2 Sheets-Sheet 1

INVENTOR.
FRED FORREST PEASE
BY
ATTORNEYS

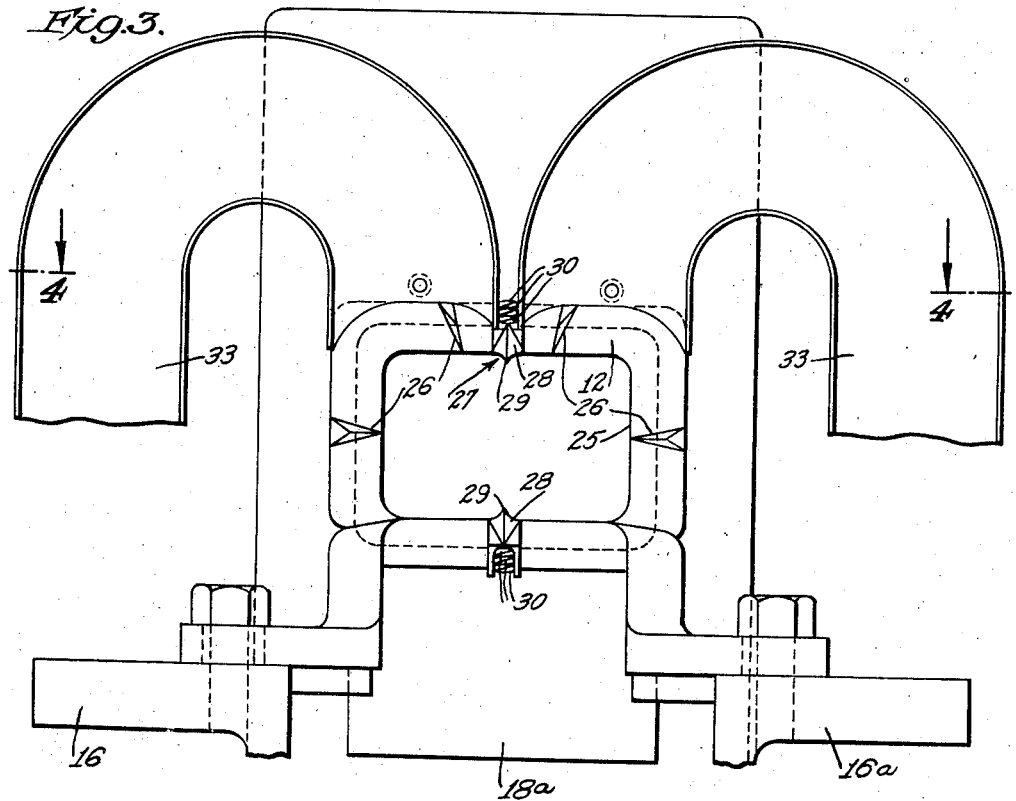
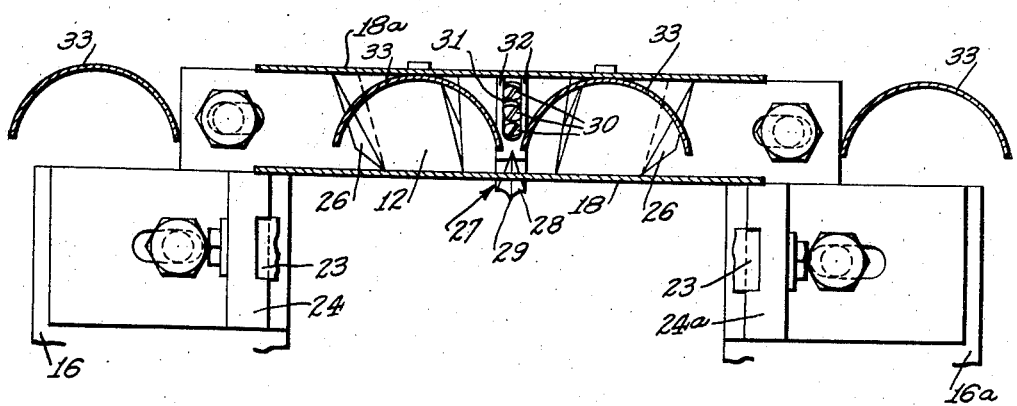

Patented Jan. 7, 1947

2,413,995

UNITED STATES PATENT OFFICE 2,413,995

BAR TRIMMER

Fred Forrest Pease, Squantum, Mass., assignor to Lever Brothers Company, Cambridge, Mass., a corporation of Maine Original application November 29, 1941, Serial No. 421,046. Divided and this application September 27, 1944, Serial No. 556,060

5 Claims. (Cl. 25—106)

1

This invention relates to devices for trimming excess material from bars of plastic material. It relates particularly to devices for trimming the excess material from the sides of elongated bars of soap to reduce them to a predetermined cross-section shape.

This is a division of Pease application Serial Number 421,046, filed November 29, 1941, now Patent Number 2,373,593 dated April 10, 1945.

An object of the present invention is to provide devices that will trim or plane the excess material from an elongated bar of plastic material without imparting a rippled or irregular surface to the trimmed bar.

Another object of the invention is to provide a device for removing excess material from the sides of an elongated bar of plastic material to reduce it to a predetermined cross-sectional shape.

A further object of the invention is to provide a device for trimming material from the sides of an elongated bar of soap to reduce it to a predetermined cross-sectional shape.

Other objects of the invention will be apparent from the following description of a typical form of device embodying the present invention.

Devices of the type embodying the present invention include a plurality of sharp-edged rigid knives, for successively engaging and trimming or planing away the surface portion of a bar of plastic material. Each knife has its cutting edges arranged to form the periphery of an opening through which the bar of plastic material is passed. The size of the opening defined by each knife is related to the size of the bar with successive knives defining successively smaller openings so that only a thin cut is taken from the bar by each of the knives.

The knives form openings of appropriate shape so that the bar lengths are trimmed to a cross-sectional shape corresponding closely to the final desired cross-sectional shape.

When trimming bars of soap, the device eliminates any surface "flow lines" that may be present and this results in the production of a more uniform and homogeneous product.

While the device may be used for trimming many different types of plastic materials, the invention will be described hereinafter with reference to the trimming of elongated bars of soap.

For a better understanding of the present invention, reference may be had to the accompanying drawings in which:

Figure 3 is a view in section taken on line 3—3 of Figure 1; and

Figure 4 is a view in section taken on line 4—4 of Figure 3.

The bar trimmer chosen to illustrate the present invention may be used to reduce elongated bars of soap D to substantially the desired dimensions of the faces of the cakes of soap to be produced therefrom and to trim away the surface portions of the soap which may contain flow lines or striations. In order to provide smooth, polished surfaces on the bars to avoid the necessity of further treating the edges of the soap cakes to be produced and to assure the bar having proper cross-sectional dimensions, the trimmer preferably is provided with sharp edged rigid knives that cut away the excess material. Other trimming devices, such as tensioned wires or the like, tend to impart a rippled surface to the bar and to vary the cross-sectional shape of the bar. The trimmer as illustrated consists essentially of three rectangular sharp edged trimming knives 10, 11 and 12. The size of these knives is related to the size of the bar of soap D so that a minimum amount of the bar is trimmed away to produce the desired area. The knife 10 therefore is somewhat smaller than the size of the bar as formed initially. The trimming knives 10 and 11 are substantially identical in construction with the exception that the knife 11 is slightly smaller in its dimensions than the knife 10 so as to further reduce the cross-sectional area of the bar after it has passed through the knife 10. The use of a plurality of knives, each removing a thin shaving from the bar has the advantages of minimizing the power required to push the bar through the trimmer, or reducing the tendency of the bar to buckle and preventing chipping or otherwise marring the surface of the trimmed bar.

Figure 2:
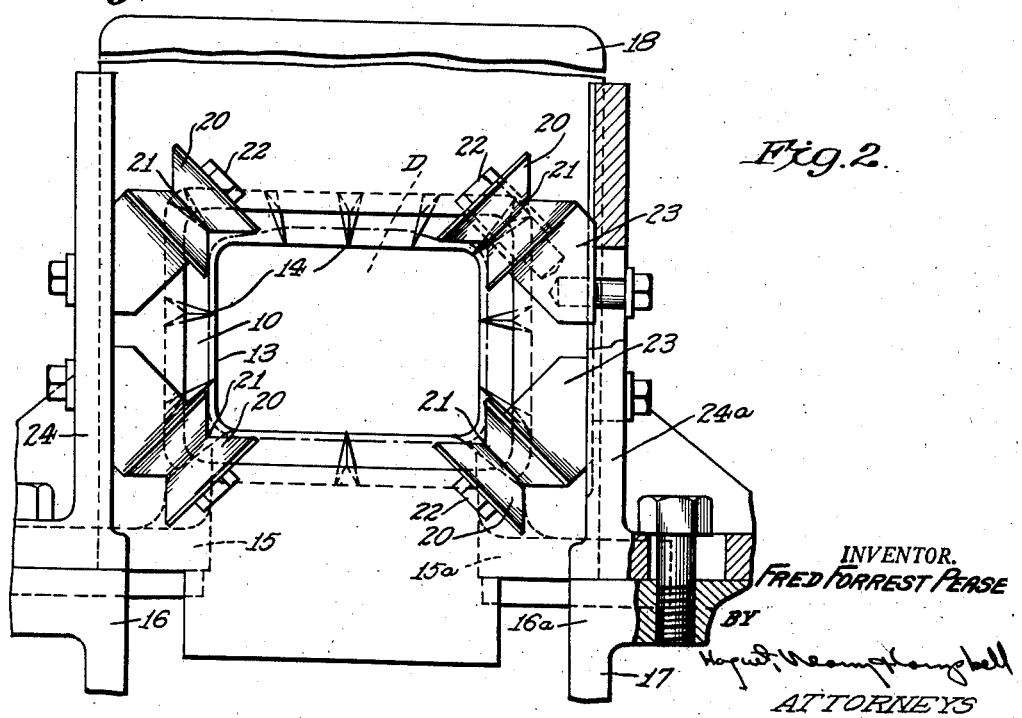
Figure 2 is a view in front elevation of the trimming device disclosed in Figure 1.

The knife 10, as best shown in Figure 2, is of hollow truncated pyramidal form having its narrower end sharpened to form a cutting edge 13 defining an opening of the shape of a rectangle having rounded ends so as to plane a shaving of soap from each of the four sides of the bar of soap D. Around the outer periphery of the knife 10 are a plurality of splitting blades 14 which having cutting edges disposed in planes substantially at right angles to the outer surfaces of the knife 10. The blades 14 serve to split the material shaved from the surface of soap bar D into a plurality of narrower shavings and to deflect them outwardly away from the bar. The knife 10 is supported upon legs 15 and 15a which extend down and out from the lower corners of the knives and are fixed to suitable spaced apart supporting base members 16 and 16a which may be secured to the end of the frame 17. The knife 11 is similar to the knife 10 and the knives 11 and 12 are similarly mounted on the base 16 and 16a.

Each of the knives 10, 11 and 12 is mounted between a pair of deflecting plates 18 and 18a, each having an aperture 19 therein sufficiently large to permit the bar of soap D to pass through it. The apertures are of successively smaller cross-sectional area corresponding to the decrease in the area of the soap bar as it passes through the knives.

The plates 18 and 18a serve to deflect the soap shavings outwardly away from the bar.

The bar is guided into the knives 10, 11 and 12 by means of four rollers 20, each of these rollers being disposed adjacent to a corner of the knife 10. The rollers 20 preferably are formed of relatively soft rubber so as to support the bar resiliently and are provided with V-shaped portions 21 spanning the corners of the bar and engaging the side portions adjacent to the corners. The rollers 20 are rotatably mounted on stud bolts 22 positioned in the adjustable blocks 23 at angles of 45° with respect to the supporting vertical uprights 24 on each side of the knife 10. The axes of rollers 20 are at right angles to each other. Both uprights 24 are fixed, with capacity for adjustment, to the supporting plates 16 and 16a.

While only one set of four rollers 20 is disclosed in the drawings, it will be understood that similar rollers may be mounted between knives 10 and 11 and 11 and 12, if desired.

Figure 1:
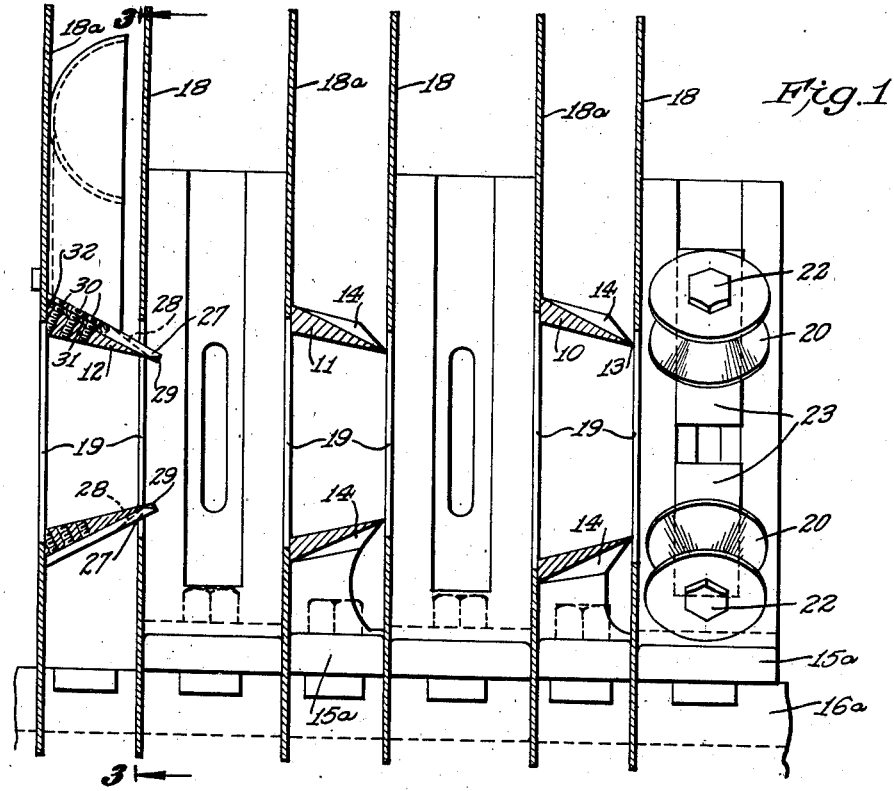
Figure 1 is a view in vertical section of a device for trimming the bar to a cross-section corresponding substantially to the cross-section of a finished cake of soap.

The knife 12, as shown in Figures 1 and 3, is of a frusto-pyramidal shape having a leading generally rectangular cutting edge 25 and is provided with a plurality of splitting knives 26 projecting from its outer surface. In addition, the knife 12 is provided with a pair of knife elements 27 for cutting a groove in each side of the soap bar. The knives 27, as shown in cross-section in Figure 1, are gouge-like elements having a concave upper surface 28 and a pointed leading end 29 which gouges out a curved wall groove in the center of the upper and lower surfaces of the bar of soap. The knives 27 are adjustable on the exterior surface of the knife 12 to take a deeper or shallower cut by means of a plurality of locking screws 30 which pass through a slot 31 in the rear end of the blade 27 and overlie inwardly projecting flanges 32 which define the slot 31 in the blade.

When the bar of soap is advanced toward the trimmer, the forward end of the bar is received between the rollers 20 and engages the cutting edge of the knife 10. As the bar of soap is pushed through the knife 10 shavings are planed from the surfaces of the bar, these shavings being split into narrower shavings by the knives 14 and deflected outwardly by the plates 18 and 18a. The bar then engages the knife 11 which takes another cut from each of the walls of the soap bar, this shaving being split and deflected and the bar then comes into engagement with the knife 12 which planes a further shaving from the surface of the bar and also grooves the upper and lower surfaces thereof by means of the knives 27.

It will be understood that more or less than three illustrative trimming blades may be used if desired, so long as the cutting operation is sufficient to produce the desired cross-sectional shape without roughening or chipping the sides of the bar.

The shavings from each of the knives, if desired, may be deflected by an arrangement of the type disclosed in Figures 3 and 4. The deflecting plate 18a for the knife 12 may be provided with oppositely directed arcuate channel members 33 which receive the shavings and deflect them outwardly and downwardly into a chute.

The bar D may be pushed through the trimming device in any suitable way, for example, by means of the pusher mechanism disclosed in application Serial Number 421,046 (Patent 2,373,593).

It will be understood that the trimming device can be modified considerably without departing from the invention. For example, the number of knives of the series can be changed, and the shape and size of the knives and rollers modified in accordance with the shape of the product to be produced.

Accordingly, it should be understood that the above-described form of the invention should be considered as illustrative only and not as limiting the scope of the following claims.

I claim:

1. A device for trimming plastic material comprising a plurality of knives, each having cutting edges defining a substantially rectangular opening therethrough, said openings being in axial alignment and of successively decreasing cross-sectional area, means for pushing a substantially rectangular bar of plastic material of greater cross-sectional area than any of said openings through said openings to cause material to be trimmed from said bar, and a plurality of rollers spanning the corners of said bar to guide it through said openings.

2. A device for trimming plastic material comprising a plurality of knives having cutting edges defining a substantially rectangular opening therethrough, said openings being in axial alignment and of successively decreasing cross-sectional area, means for pushing a substantially rectangular bar of material of greater cross-sectional area than any of said openings through said openings to cause material to be trimmed from said bar, and a plurality of rollers having V-shaped surfaces in cross-section engaging the surfaces of said bar adjacent to its corners to guide said bar into said openings.

3. A device for trimming plastic material comprising a plurality of knives having cutting edges defining a substantially rectangular opening therethrough, said openings being in axial alignment and of successively decreasing cross-sectional area, means for pushing a substantially rectangular bar of material of greater cross-sectional area than any of said openings through said openings to cause material to be trimmed from said bar, a pair of resilient rollers having V-shaped surfaces in cross-section on each side of said bar, and means supporting said rollers with their axes at right angles to each other to cause said rollers to span the corners of said bar and guide it into said openings.

4. A knife for trimming bars of plastic material comprising means having a plurality of knife edges arranged to define an opening through which a bar of material may be passed to trim it to a desired cross-section, a plurality of cutting elements on the exterior of said means for splitting the material trimmed from said bar by said knife edges into narrower strips, and means disposed behind said knife edges for deflecting said strips away from the bar passing through said opening.

5. A knife for trimming bars of plastic material comprising means having a plurality of knife edges arranged to define an opening through which a bar of material may be passed to trim it to a desired cross-section, and a member having outwardly directed channels located behind said knife edges for deflecting material trimmed from said bar away from said bar.

FRED FORREST PEASE.